(12) United States Patent
Yang et al.

(10) Patent No.: US 7,969,731 B2
(45) Date of Patent: Jun. 28, 2011

(54) PORTABLE COMPUTING DEVICE HAVING LATCHING MECHANISM

(75) Inventors: Xin Yang, Shenzhen (CN); Wei Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/770,684

(22) Filed: Apr. 29, 2010

(65) Prior Publication Data

US 2011/0075355 A1 Mar. 31, 2011

(30) Foreign Application Priority Data

Sep. 29, 2009 (CN) .......................... 2009 1 0307954

(51) Int. Cl.
*H05K 5/00* (2006.01)
*H05K 7/00* (2006.01)

(52) U.S. Cl. .............................. 361/679.55; 361/679.58

(58) Field of Classification Search ............. 361/679.55, 361/679.58
See application file for complete search history.

(56) References Cited

U.S. PATENT DOCUMENTS

| | | | | |
|---|---|---|---|---|
| 6,129,395 | A * | 10/2000 | Schlesener et al. | 292/128 |
| 6,659,516 | B2 * | 12/2003 | Wang et al. | 292/251.5 |
| 7,420,799 | B2 * | 9/2008 | Wang | 361/679.27 |
| 7,495,901 | B2 * | 2/2009 | Yun et al. | 361/679.55 |

* cited by examiner

*Primary Examiner* — Jayprakash N Gandhi
*Assistant Examiner* — Anthony M Haughton
(74) *Attorney, Agent, or Firm* — Zhigang Ma (57) ABSTRACT

A portable computing device includes a base including a first surface, and a lid that is pivotably connected to the base and includes a second surface. One of the first surface and the second surface defines a through opening. A latching mechanism for locking the lid onto the base includes a protruding tab that protrudes from the other one of the first surface and the second surface and defines a through hole. The latching mechanism also includes a hook arranged within and rotatably connected to one of the base and the lid. The hook is configured for engaging the through hole of the protruding tab extending through the through opening, to lock the lid onto the base. An elastic member is provided to apply a spring force to the hook to cause the hook to rotate back to an original position after the hook disengages from the protruding tab.

11 Claims, 9 Drawing Sheets

PORTABLE COMPUTING DEVICE HAVING LATCHING MECHANISM

BACKGROUND

1. Technical Field

The present disclosure relates to portable computers and, more particularly, to a portable computer having a latching mechanism to lock a lid to a base.

2. Description of Related Art

A typical notebook computer includes a base that houses most of the electronics and a display enclosure that houses a display. Generally, the display includes two engaging hooks protruding from the display enclosure. The base includes two latching slots. The engaging hooks engage the slots to lock the display onto the base. Although this type of latching mechanism works up to the expectations, a new type of latching mechanism for use in a portable computing device is still needed.

BRIEF DESCRIPTION OF THE DRAWINGS

The components in the drawings are not necessarily drawn to scale, the emphasis instead being placed upon clearly illustrating the principles of the portable computing device having a latching mechanism. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
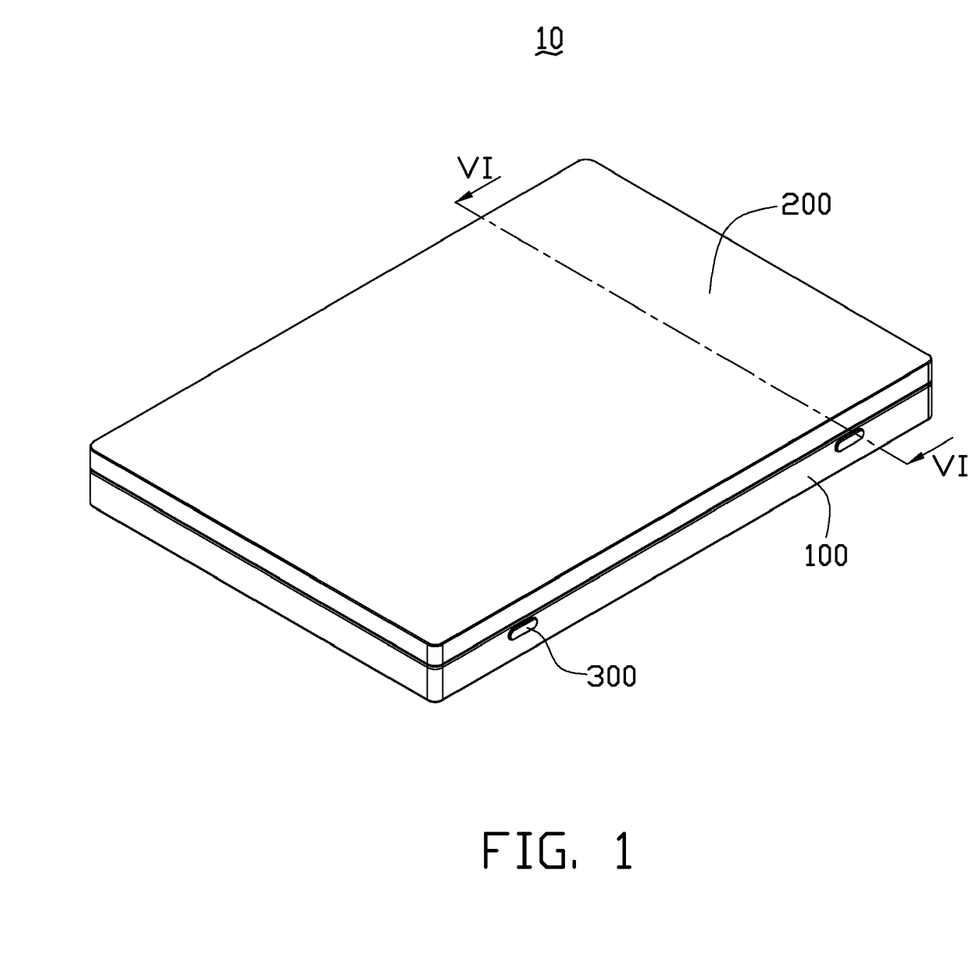
FIG. 1 is an isometric view of a portable computing device in accordance with an exemplary embodiment.
Figure 2:
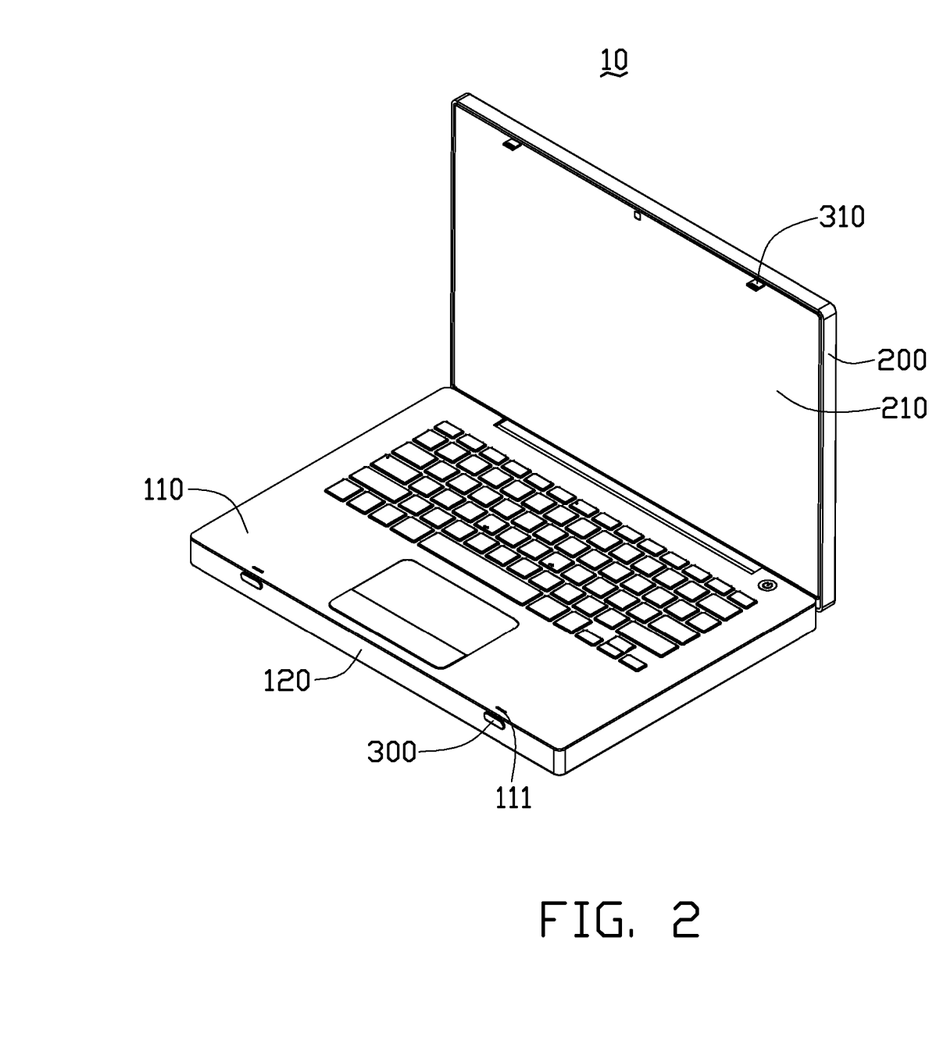
FIG. 2 shows that the portable computing device of FIG. 1 stays at an open state.
Figure 3:
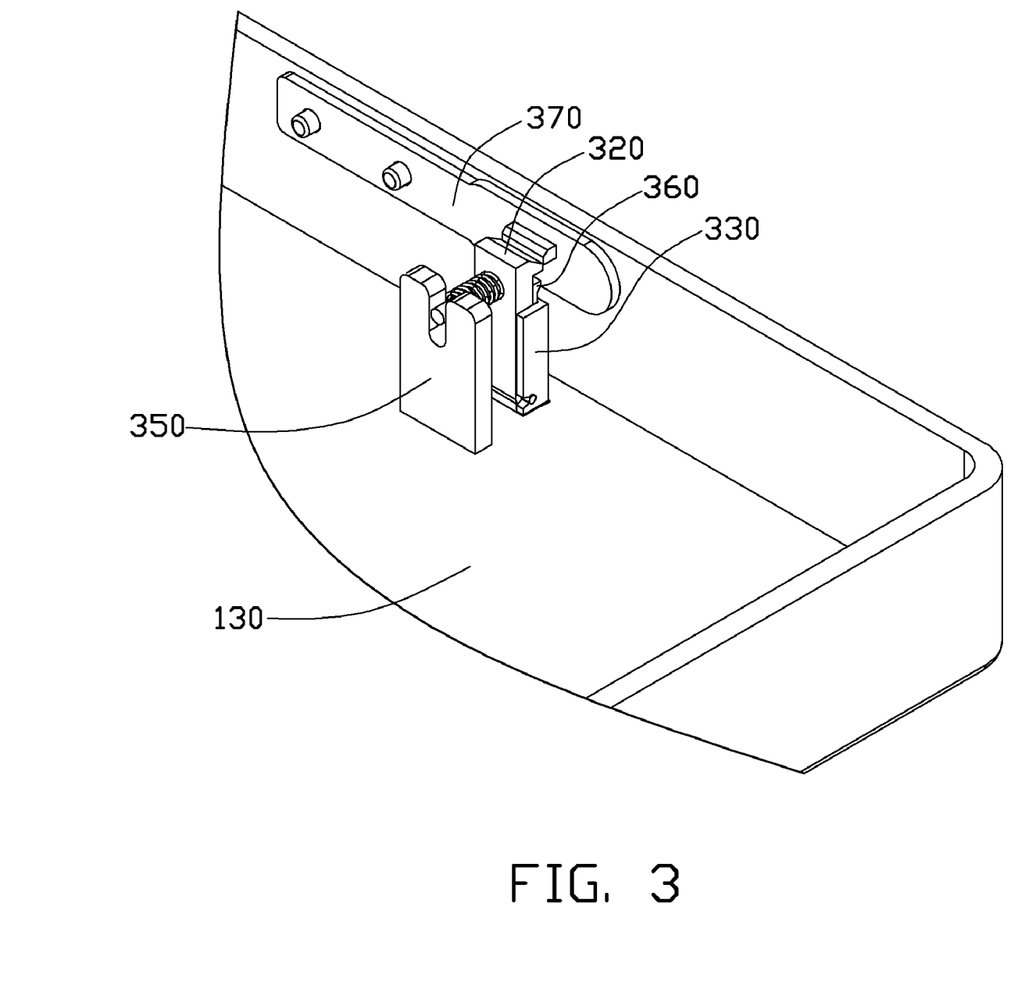
FIG. 3 is a partial view of the portable computing device of FIG. 1, with certain components omitted to show a latching mechanism of the portable computing device.
Figure 4:
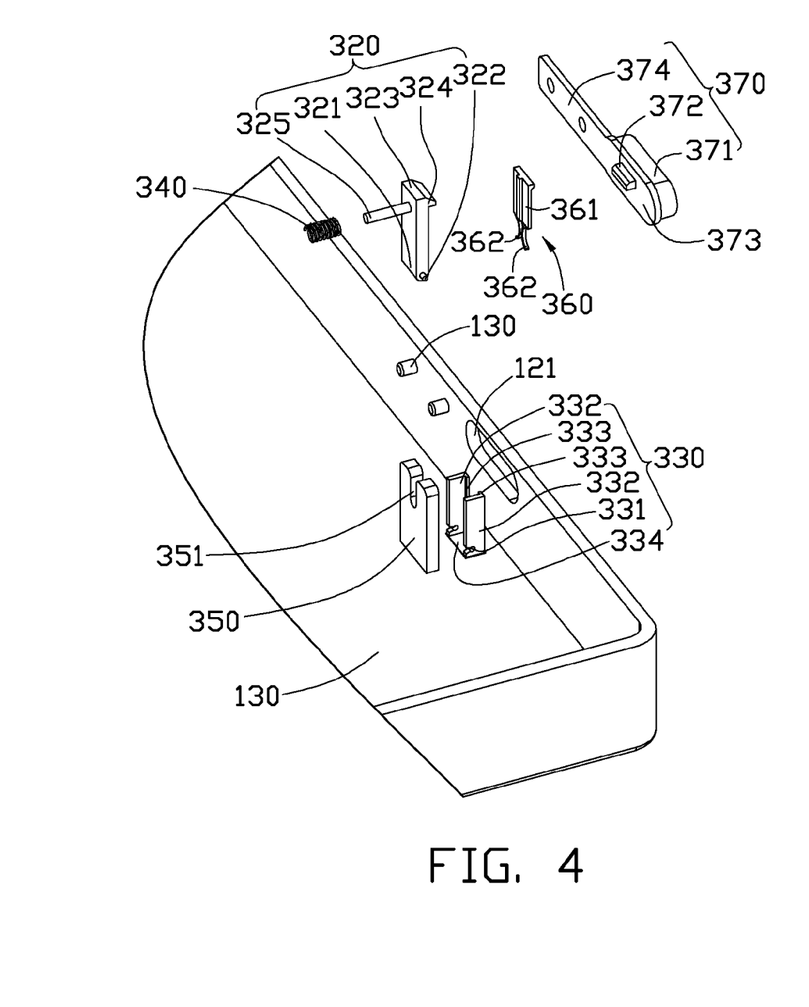
FIG. 4 is an exploded view of the latching mechanism of FIG. 3.
Figure 5:
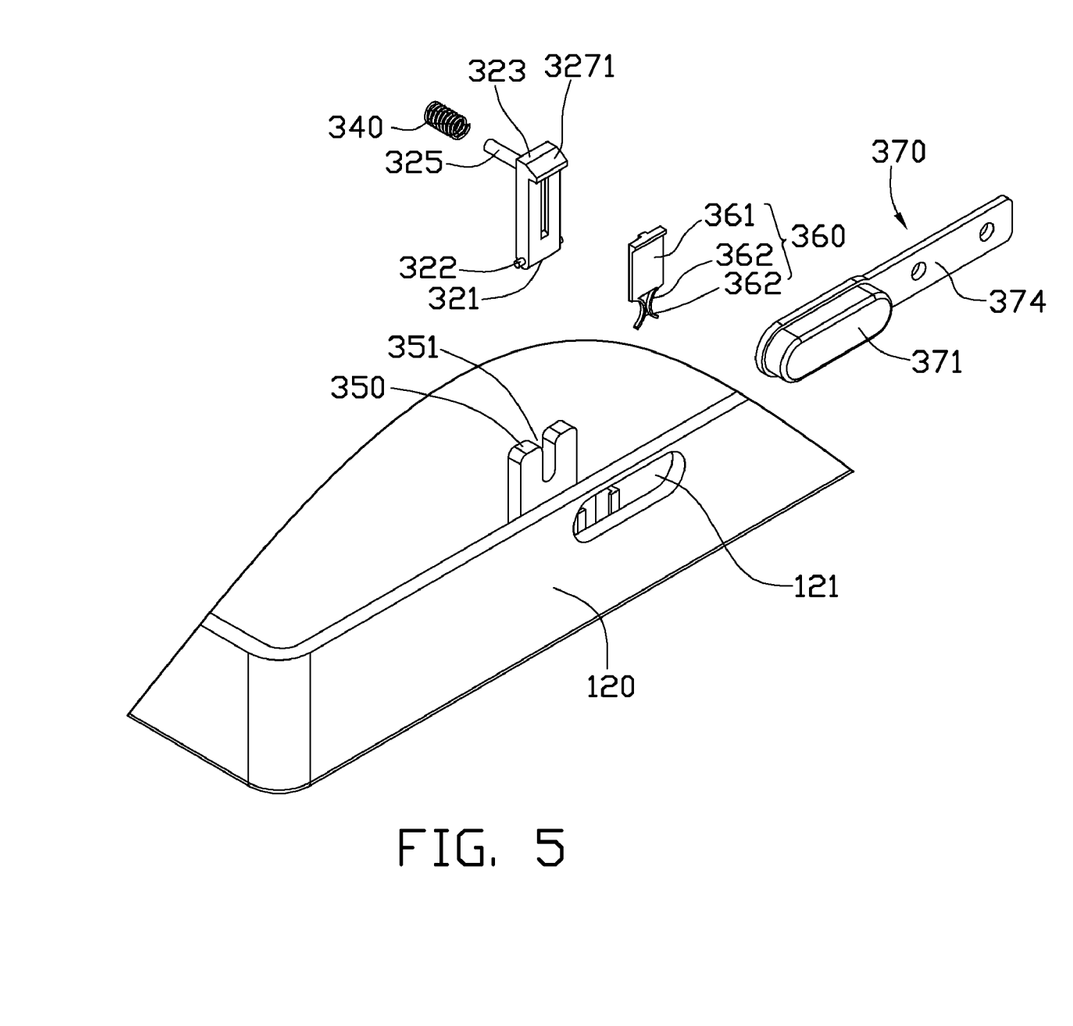
FIG. 5 is another exploded view of the latching mechanism of FIG. 3, viewed from another perspective.

FIG. 1 shows a portable computing device 10 that includes a base 100 and a lid 200 pivotably connected to the base 100. The base 100 houses most of the electronics (not shown). In the embodiment, the portable computing device 10 is a notebook computer. The notebook computer 10 also includes a pair of latching mechanisms 300 to lock the lid 200 onto the base 100. The number of the latching mechanisms 300 may vary according to need.

Referring to FIGS. 2-5, the base 100 includes an upper surface 110 and a front sidewall 120. The upper surface 110 defines a pair of through holes 111 spaced apart from each other. A pair of through openings 121 (shown in FIG. 4) are formed in a location of the sidewall 120, and each of the through openings 121 is adjacent to one of the through holes 111. The lid 200 includes a mating surface 210 that opposes the upper surface 110 when the lid 200 stays in a lock state.

The two latching mechanisms 300 have the same components arranged in the same manner and one latching mechanism 300 will be described in detail later. The latching mechanism 300 includes a protruding tab 310, a hook 320, a resilient member 360, and a push button 370. In the embodiment, the protruding tab 310 protrudes from the mating surface 210 of the lid 200. The protruding tab 310 defines a through hole 311 (shown in FIG. 6) at one end. The protruding tab 310 extends through the through hole 111 and stays within the base 100.

The hook 320 is pivotably connected to the base 100 via a frame 330 within the base 100. The hook 320 is a flat plate including a connecting end 321, each side of which defines a protruding axle 322. The protruding axles 322 are inserted into two recesses 331 formed in two supporting walls 332 of the frame 330, respectively, which allow the hook 320 to rotate with respect to the base 100. The hook 320 also includes a distal end 323 that defines a hook portion 324. The hook portion 324 is used to be received in the through hole 311 of the protruding tab 310, to lock the lid 200 onto the base 100.

A post 325 protrudes from the hook 320 around which an elastic member 340 is arranged. A distal end of the post 325 is movably received in an open-ended slot 351 formed in a protruding plate 350 fixed to the bottom of the base 100. The frame 330 and the plate 350, which locates at two sides of the hook 320, cooperate to define a range in which the hook 320 rotates. The rotation of the hook 320 is stopped when the hook 320 contacts the frame 330 or the plate 350.

In the embodiment, the elastic member 340 is a coil spring. Two ends of the coil spring 340 stay in contact with the hook 320 and the protruding plate 350, which causes the coil spring 340 to slightly compress. In another embodiment, two ends of the coil spring 340 are fixed to the hook 320 and the protruding plate 350. The coil spring 340 is further compressed after the hook 320 rotates away from an original position, which can thus apply a spring force to drive the hook 320 to rotate back to the original position, until the frame 330 stops the rotation of the hook 320.

The resilient member 360 is used to engage the protruding tab 310 to apply a spring force to push the protruding tab 310 to move upward after the hook 320 disengages from the protruding tab 310. In the exemplary embodiment, the resilient member 360 includes a base plate 361 and two spring legs 362 protruding from the base plate 361. The resilient member 360 is sandwiched between the hook 320 and ribs 333 protruding from the supporting walls 332 of the frame 330. The spring legs 362 stay in contact with a bottom 334 of the frame 330 and move away from each other after the protruding tab 310 rests on the top of the base plate 361, which applies a spring force to the protruding tab 310. In another embodiment, the resilient member 360 may be a coil spring.

The push button 370 includes a button portion 371 movably received in the through opening 121 of base 100. A protrusion 372 is formed on a back surface 373 of the button portion 371. The button portion 371 receives external press from a user to move inward to cause the protrusion 372 to push the hook portion 324 of the hook 320 out of the through hole 311 of the protruding tab 310. The push button 370 also includes an arm 374 that extends from an end of the button portion 371 and is cantilever-mounted to an inner surface of the base 100, which allows it to be deflected elastically. The button portion 371 can thus return to its initial position after being pressed.

Figure 6:
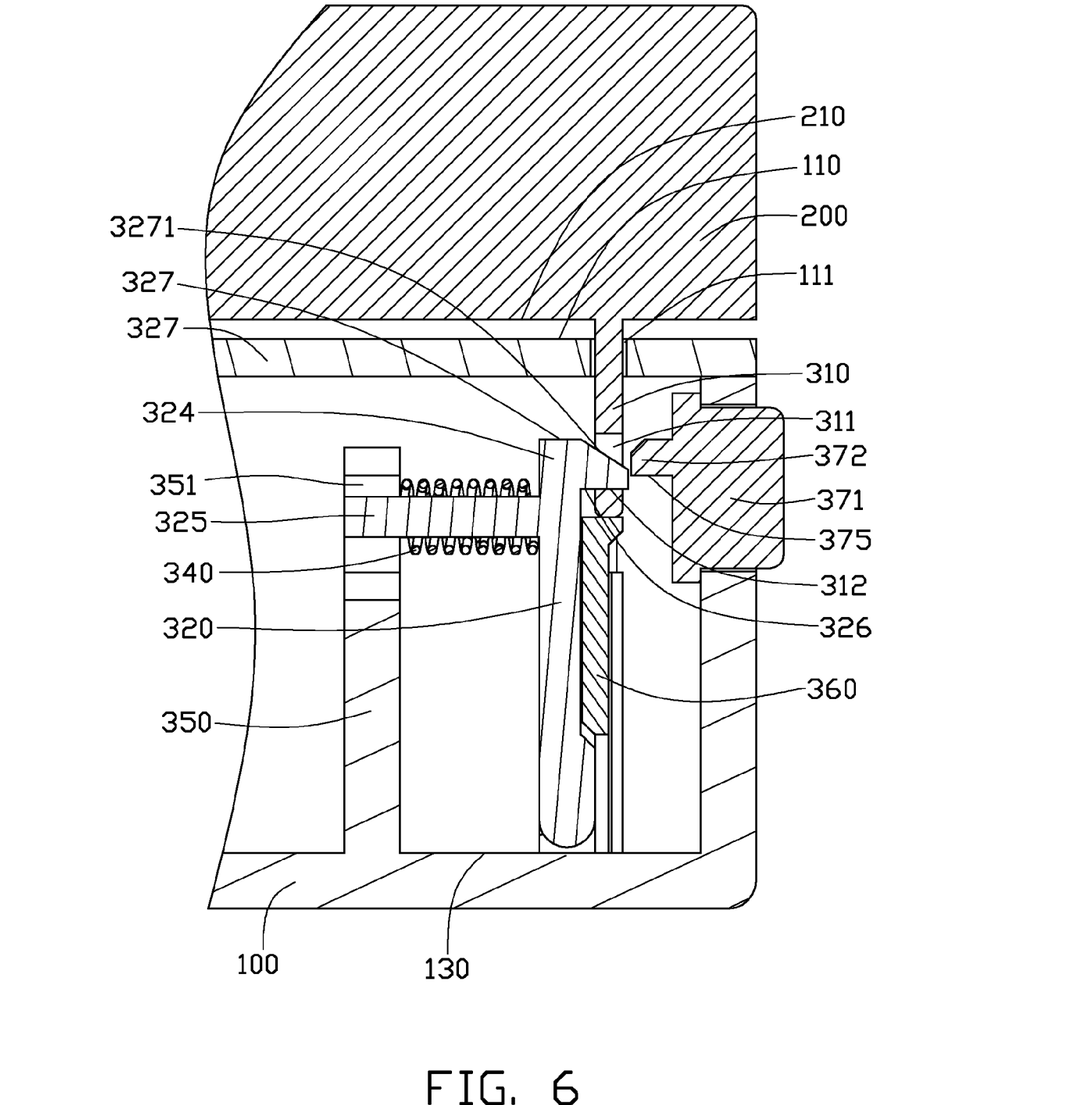
FIG. 6 is a cross-sectional view of the latching mechanism of FIG. 1, taken along line VI-VI of FIG. 1.

FIG. 6 shows that the lid 200 stays at a locking state. Specifically, the hook 320 stays substantially upright and the hook portion 324 keeps in a locking position where the hook portion 324 is received in the through hole 311 of the protruding tab 310. A bottom surface 326 of the hook portion 324 engages a lower edge 312 (shown in FIG. 8) of the through hole 311. The distance between a bottom surface 375 of the button portion 371 and the bottom 130 of the base 100 is greater than the distance between the bottom surface 326 of the hook portion 324 and the bottom 130 of the base 100.

Figure 7:
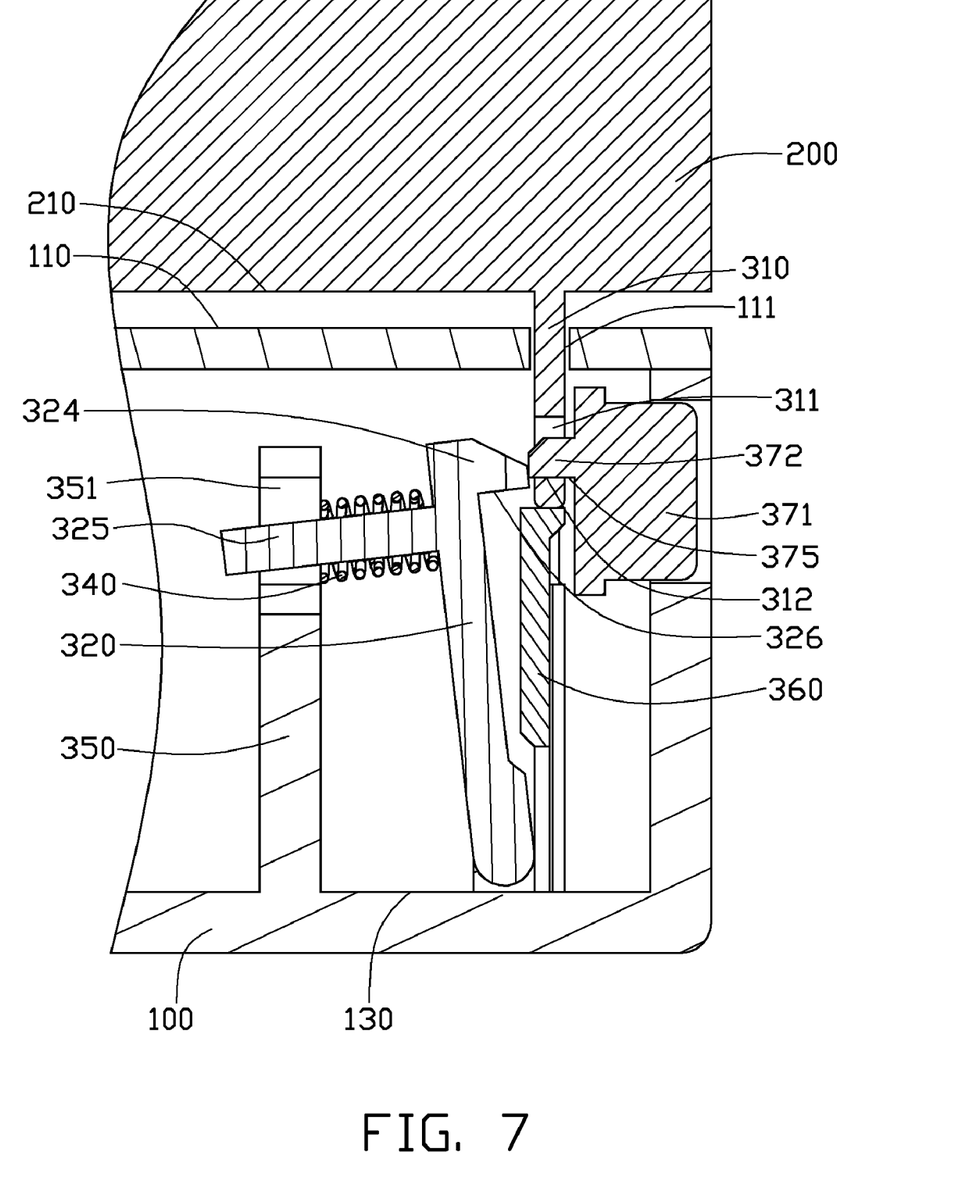
FIG. 7 is similar to FIG. 6, but showing that a button portion of the latching mechanism of FIG. 3 is pushed into a housing of the portable computing device.

Referring to FIG. 7, to unlatch the lid 200, the button portion 371 is pressed to cause the protrusion 372 to move inward to push the hook portion 324 out of the through hole 311 of the protruding tab 310. The protrusion 372 then stays within the through hole 311. Because the distance between the bottom surface 375 and the bottom 130 is greater than the distance between the bottom surface 326 and the bottom 130, the protruding tab 310 will be driven by the resilient member 340 to move upwardly from the locking position until the lower edge 312 (shown in FIG. 8) of the through hole 311 engages the bottom surface 375 of the button portion 371.

Figure 8:
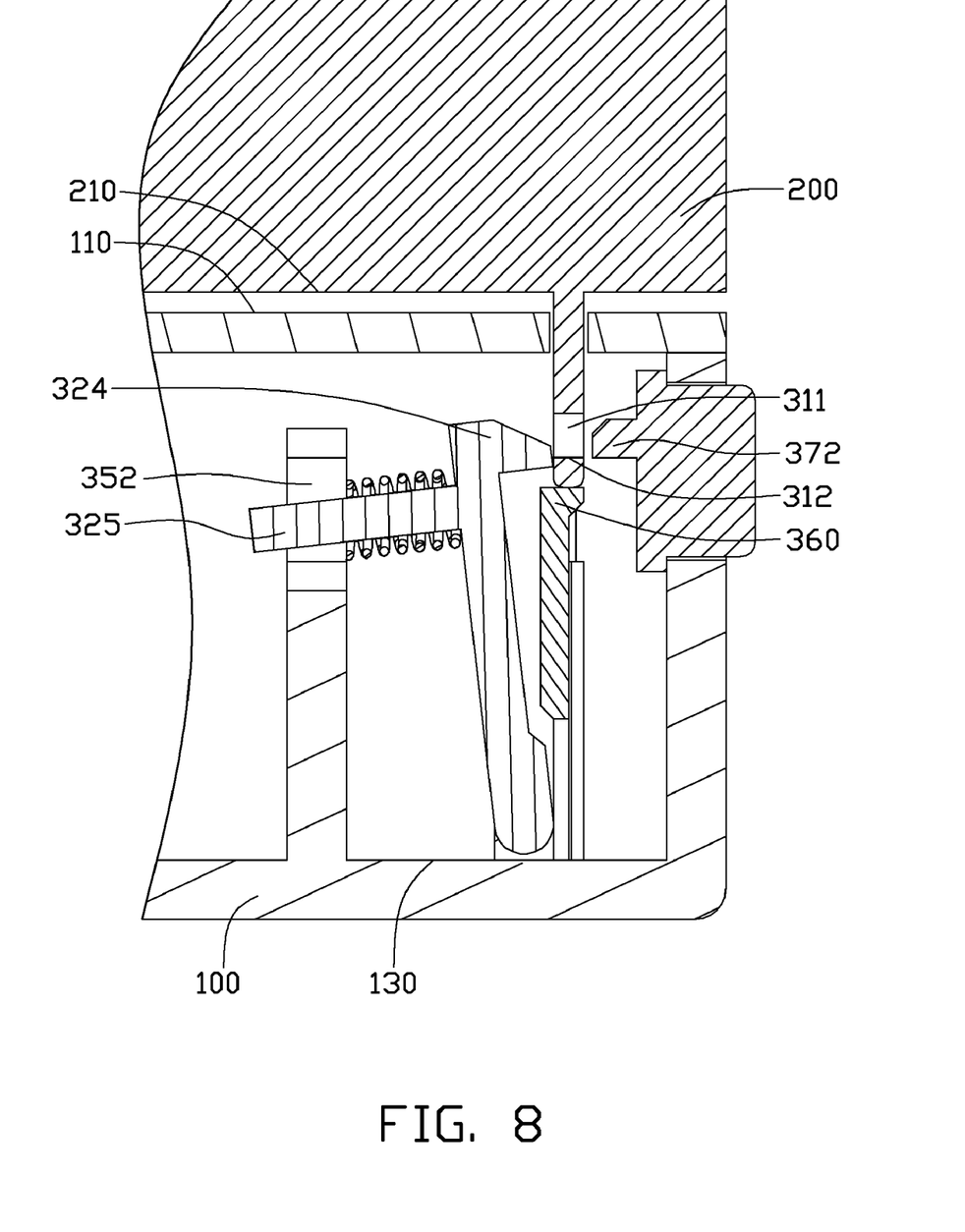
FIG. 8 is similar to FIG. 7, but showing that the button portion of the latching mechanism of FIG. 3 returns to its initial position.
Figure 9:
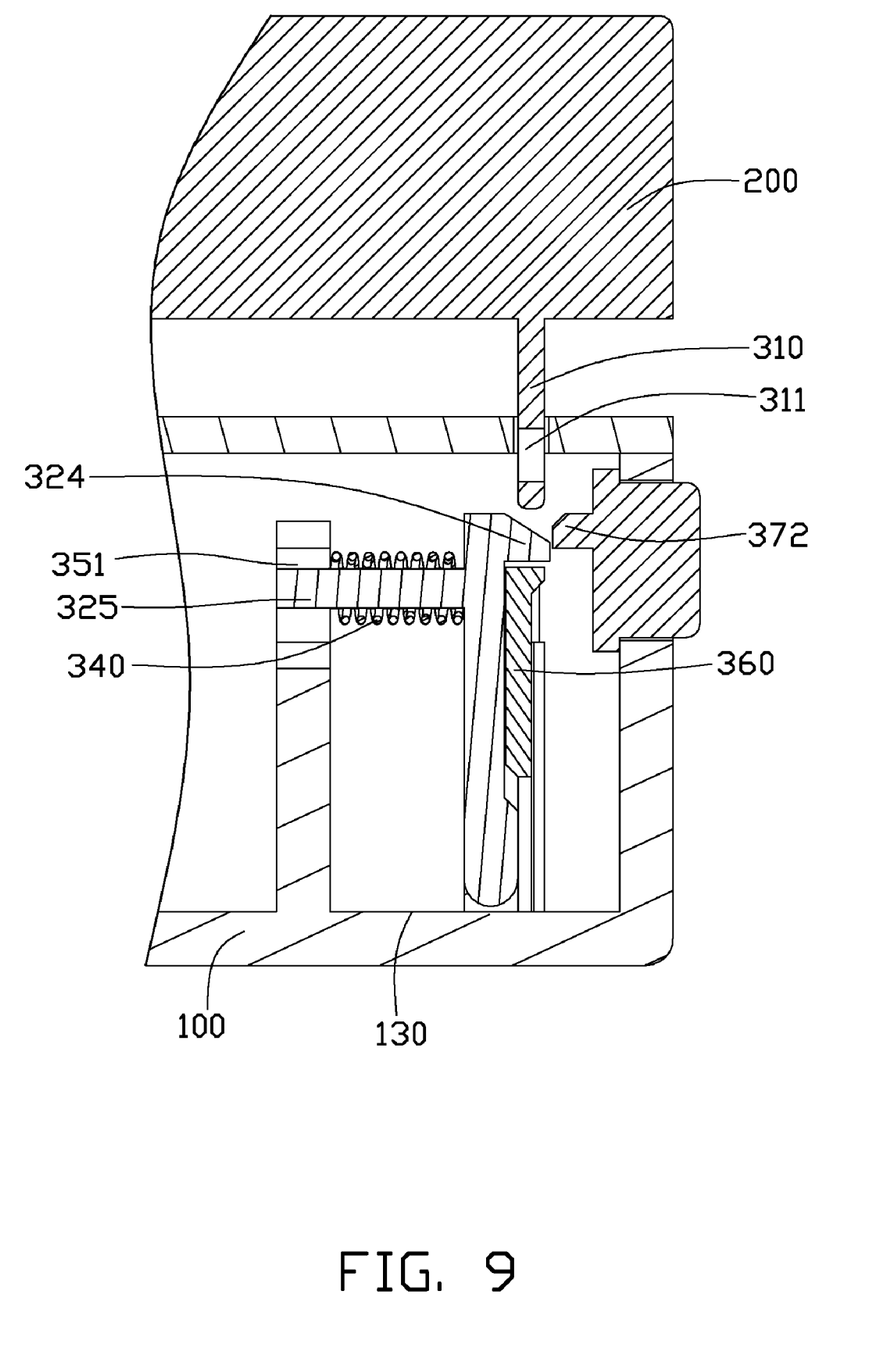
FIG. 9 is similar to FIG. 8, but showing that a lid of the portable computing device of FIG. 1 stays at a free state.

Referring to FIGS. 8 and 9, after the external press ceases, the button portion 371 returns to its initial position by the spring force of the arm 374, which causes the protrusion 372 to move out of the through hole 311 of the protruding tab 310. The protruding tab 310 thus frees from limitation and the lid 200 can then be rotated with respect to the base 100.

To lock the lid 200 onto the base 100, the lid 200 is rotated toward the base 100 to cause the protruding tab 310 to move into the base 100 through the through hole 111. While moving into the base 100, the protruding tab 310 first stays in contact with a top 327 (see FIG. 6) of the hook 320. In the exemplary embodiment, the top 327 includes a sloped surface 3271 to engage the protruding tab 310, such that the force applied to the top 327 can have a force substantially perpendicular to the hook 320. The hook 320 is then caused to rotate away from its original position. After that, the protruding tab 310 further engages the top of the resilient member 360. The spring legs 362 are caused to deform elastically and move away from each other, which causes the base plate 361 to move downward. After the protruding tab 310 moves to the locking position, the hook portion 324 is driven by the coil spring 340 to move into the through hole 311, which thus locks the lid 200 onto the base 100.

It is noteworthy that the protruding tab 310 may be arranged on the surface 110 of the base, and the other components of the latching mechanism 300 may be arranged within the lid 200.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A portable computing device comprising:
    a base comprising a first surface;
    a lid pivotably connected to the base and comprising a second surface, wherein one of the first surface and the second surface defines at least one through opening; and
    at least one latching mechanism for locking the lid onto the base comprising:
        a protruding tab protruding from the other one of the first surface and the second surface and defining a through hole;
        a hook arranged within and rotatably connected to one of the base and the lid, which does not have the protruding tab, wherein the hook comprises a hook portion configured for being received in the through hole of the protruding tab extending through the at least one through opening, to lock the lid onto the base, the hook portion comprises a bottom surface;
        an elastic member arranged to apply a spring force to the hook to cause the hook to rotate back to an original position after the hook disengages from the protruding tab;
        a resilient member arranged to apply a spring force to the protruding tab after the hook disengages from the protruding tab; and
        a push button comprising a protrusion to push the hook portion of the hook to disengage from the protruding tab, wherein the hook portion comprises a bottom surface that is higher than the bottom surface of the hook portion of the hook.

2. The portable computing device according to claim 1, wherein the base includes a front wall defining an orifice extending therethrough, the push button includes a button portion movably received in the orifice, and an arm extending from the button portion, the arm is cantilever-mounted to an inner surface of the front wall, which allows the arm to deflect elastically.

3. The portable computing device according to claim 1, wherein the at least one latching mechanism further comprises a frame and a protruding plate spaced from each other and protruding from a bottom of the base, the hook is arranged between the frame and the protruding plate and is limited by the frame and the protruding plate to rotate in a predetermined range.

4. The portable computing device according to claim 3, wherein the elastic member is a coil spring, two ends of the elastic member are fixed to the hook and the protruding plate.

5. The portable computing device according to claim 3, wherein the elastic member is a coil spring, the elastic spring is arranged around a post protruding from the hook, one end of the post is movably received an open-end slot defined in the protruding plate, two ends of the elastic member stay in contact with the hook and the protruding plate.

6. The portable computing device according to claim 3, wherein the hook comprises a flat plate comprising a connecting end pivotably connected to the frame, and a distal end forming a hook portion to engage the through hole of the protruding tab.

7. The portable computing device according to claim 6, wherein the hook portion comprises an inclined surface to engage the protruding tab, which allows a push force to be applied to the hook to rotate.

8. The portable computing device according to claim 1, wherein the resilient member includes a base plate and two spring legs protruding therefrom, the two spring legs are capable of deforming elastically after an external force is applied.

9. The portable computing device according to claim 1, wherein the resilient member is a coil spring.

10. The portable computing device according to claim 3, wherein the frame comprises two supporting walls each defining a recess, the hook comprises two axles rotatably retained within the recesses of the two supporting walls, respectively.

11. The portable computing device according to claim 10, wherein the frame comprises two ribs protruding from the two supporting walls, respectively, the two ribs cooperate with the protruding plate to define a range in which the hook rotates.

* * * * *